Patented Dec. 2, 1941

2,264,448

UNITED STATES PATENT OFFICE 2,264,448

PROCESS FOR REMOVING SUSPENDED, EMULSIFIED, OR COLLOIDALLY DISSOLVED MATERIALS FROM WATER

Fredrik André Möller, Haren, near Groningen, Netherlands, assignor to Naamlooze Vennootschap: W. A. Scholten's Chemische Fabrieken, Groningen, Netherlands, a corporation of the Netherlands No Drawing. Application July 16, 1938, Serial No. 219,662. In the Netherlands March 26, 1938

8 Claims. (Cl. 210—23)

It is known that water in which insoluble materials are suspended, emulsified or dissolved colloidally, may be purified by the addition of electrolytes by means of which the impurities are flocculated. A substance frequently applied for this purpose is, e. g., aluminium sulphate. It is also known that recently solutions obtained by boiling starch or soluble starch with water have been used.

I have now found that very favourable results can be attained by using cold swelling starches for the flocculating process. By cold swelling starches are to be understood products which have the property of swelling with water in the cold to a thick viscous mass, and which are obtained by mixing starch with a small amount of water, heating the mixture suddenly to above the gelatinising temperature, pressing the mixture into thin layers and simultaneously or immediately thereafter, drying the same and grinding the dried mass.

I have found that solutions of this cold swelling starch cause a better flocculation than the known solutions of common starch or soluble starch prepared in the heat, which probably is due to the fact that cold swelling starches with the particles of the dispersed substances form large aggregates which easily separate from the liquid.

The cold swelling starch may be previously dissolved in water and in the form of this solution added to the water to be purified. However the cold swelling starch may also be mixed in dry state with the water to be purified, provided that the cold swelling starch is distributed uniformly through the water and does not form lumps.

This process may be improved considerably by adding a small proportion of alkaline substances to the cold swelling starch. This is preferably done by adding the alkaline substance, e. g. soda, before or during the preparation of the cold swelling starch. The alkaline substance may however also be mixed with the dry cold swelling starch, or added to the cold swelling starch solution. By the reaction of the alkali the properties of the swelling starch are improved so as to effect a better flocculation when using this cold swelling starch for purifying, or clarifying water.

According to the present invention the separation of the dispersed substances may be improved by adding, during the treatment with cold swelling starch, a small proportion of acid to the water, so as to produce a neutral or a weakly acid reaction. The iso-electrical point is thereby attained which results in a quicker and completer flocculation of the aggregates of the impurities with the cold swelling starch in very dilute solution.

The acidulation may be effected by adding the required acids to the water to be purified before, during or after the mixing with the cold swelling starch. The acid may however also be previously added to the cold swelling starch solution, or in some cases even to the dry cold swelling starch. Of course the precipitation may also be effected in an acid or neutral medium, when cold swelling starches are used which have been treated with alkaline substances.

For the purpose of rendering the cold swelling starch alkaline and acidulating the solution to be clarified, also salts, preferably containing polyvalenions and having an alkaline or acid reaction, may be used, if desired, the application of said salts being already known per se for the purpose of clarifying water, e. g., sodium aluminate, sodium silicate, alum and the like.

The process according to the present invention shows considerable technical and economical advantages. According to the process described it is already possible to precipitate colloidally dissolved or finely suspended impurities or to cause the same to settle down more quickly, by the addition of a small proportion of starch. The quantity of chemicals which according to this method is introduced into the water with the cold swelling starch, is extremely small, which is of great importance, particularly with regard to the treatment of drinking water. The cold swelling starch dissolved has a considerable better effect than other starch solutions, e. g. those which have been obtained by boiling soluble starch or by treating starch in dilute, liquid state with chemicals. Of course it is also of much importance for practical purposes, that the product is available in dry condition and can be dissolved without heating, whereas other starch products are to be either dissolved by boiling with water, or delivered in liquid state.

The present invention may be used for the purpose of purifying water in all cases in which suspended, emulsified or colloidally dissolved substances are to be removed, e. g. for purifying drinking water and water for swimming pools, and for clarifying waste water. The present process may, however, also be applied for recovering the suspended materials e. g. for the separation of coal from the sludge water of coal mines and the like.

It is well known that starch products which swell in cold water at normal temperatures can be manufactured by mixing starch with a small amount of water, suddenly heating the mixture pressed into thin layers to a temperature above the gelatinizing point and simultaneously or immediately thereafter drying the material. By grinding the dry mass so-called cold swelling starch is obtained which has the property of swelling with water in the cold to a thick paste, and I wish it to be understood that when using the term "cold swelling starch" in the specification and claims I mean only those starch products which are obtained by the method indicated above.

I claim:

1. A process for removing suspended, emulsified or colloidally dissolved particles from water comprising incorporating a cold swelling starch capable of swelling when mixed with cold water maintained at or below normal temperature and then separating the precipitated particles from the water.

2. A process for removing suspended, emulsified or colloidally dissolved particles from water comprising mixing the water maintained at or below normal temperature with a solution of a cold swelling starch capable of swelling when mixed with cold water maintained at or below normal temperature and then separating the precipitated particles from the water.

3. A process for removing suspended, emulsified or colloidally dissolved particles from water comprising mixing the water maintained at or below normal temperature with a solution of a cold swelling starch capable of swelling when mixed with cold water maintained at or below normal temperature and which has been treated with an alkaline substance and then separating the precipitated particles from the water.

4. A process for removing suspended, emulsified or colloidally dissolved particles from water comprising mixing the water maintained at or below normal temperature with a solution of a sold swelling starch capable of swelling when mixed with cold water maintained at or below normal temperature and which has been treated with a salt of a polybasic acid having an alkaline reaction and then separating the precipitated particles from the water.

5. A process for removing suspended, emulsified or colloidally dissolved particles from water comprising mixing the water maintained at or below normal temperature with a solution of a cold swelling starch capable of swelling when mixed with cold water maintained at or below normal temperature, acidulating the water during such treatment and then subsequently separating the precipitated particles from the water.

6. A process for removing suspended, emulsified or colloidally dissolved particles from water comprising mixing the water maintained at or below normal temperature with a solution of a cold swelling starch capable of swelling when mixed with cold water maintained at or below normal temperature, acidulating the water during such treatment so as to produce the isoelectric point and then separating the precipitated particles from the water.

7. A process for removing suspended or colloidally dissolved particles from water comprising mixing the water maintained at or below normal temperature with a solution of a cold swelling starch capable of swelling when mixed with cold water maintained at or below normal temperature, acidulating the water during such treatment by adding a salt of a polybasic acid having an acid reaction and then separating the precipitated particles from the water.

8. A process for removing suspended, emulsified or colloidally dissolved particles from water comprising mixing the water maintained at or below normal temperature with a solution of a cold swelling starch capable of swelling when mixed with cold water maintained at or below normal temperature and which has been treated with an alkaline substance, acidulating the water during treatment with said cold swelling starch and then removing the precipitated particles from the water.

FREDRIK ANDRÉ MÖLLER.